(12) United States Patent
Brown et al.

(10) Patent No.: US 8,590,335 B2
(45) Date of Patent: Nov. 26, 2013

(54) METHOD AND APPARATUS FOR CLEARING OIL INJECT CIRCUIT FOR CHANGING OIL TYPES

(75) Inventors: William Brown, Owatonna, MN (US); Mark McMasters, Owatonna, MN (US); Gary Murray, Montpelier, OH (US)

(73) Assignee: Bosch Automotive Service Solutions LLC, Warren, MI (US)

(*) Notice: Subject to any disclaimer, the term of this patent is extended or adjusted under 35 U.S.C. 154(b) by 50 days.

(21) Appl. No.: 13/406,052

(22) Filed: Feb. 27, 2012

(65) Prior Publication Data
US 2012/0186280 A1 Jul. 26, 2012

Related U.S. Application Data

(63) Continuation of application No. 12/254,202, filed on Oct. 20, 2008, now Pat. No. 8,122,731.

(60) Provisional application No. 61/024,398, filed on Jan. 29, 2008.

(51) Int. Cl.
*F25B 45/00* (2006.01)

(52) U.S. Cl.
USPC .................................. 62/292; 62/84; 62/149

(58) Field of Classification Search
USPC .................. 62/77, 84, 85, 145, 149, 292, 475
See application file for complete search history.

(56) References Cited

U.S. PATENT DOCUMENTS

| | | | |
|---|---|---|---|
| 4,200,121 A | 4/1980 | Walter et al. | |
| 4,938,031 A | 7/1990 | Manz et al. | |
| 4,939,905 A | 7/1990 | Manz | |
| 5,005,375 A | 4/1991 | Manz et al. | |
| 5,042,271 A | 8/1991 | Manz | |
| 5,080,132 A | 1/1992 | Manz et al. | |
| 5,172,562 A * | 12/1992 | Manz et al. | 62/149 |
| 5,231,842 A * | 8/1993 | Manz et al. | 62/77 |
| 5,248,125 A | 9/1993 | Fritch et al. | |
| 5,353,603 A | 10/1994 | Outlaw et al. | |
| 5,390,503 A * | 2/1995 | Cheng | 62/125 |
| 5,548,966 A * | 8/1996 | Tinsler | 62/77 |
| 5,560,215 A | 10/1996 | Talarico | |
| 5,758,506 A | 6/1998 | Hancock et al. | |
| 6,134,896 A | 10/2000 | Brown et al. | |
| 6,141,977 A | 11/2000 | Zugibe | |
| 6,185,945 B1 | 2/2001 | Pfefferle et al. | |
| 6,202,433 B1 | 3/2001 | Murray et al. | |
| 6,334,320 B1 | 1/2002 | Brown et al. | |
| 6,338,255 B1 | 1/2002 | Richard et al. | |
| 6,539,988 B1 | 4/2003 | Cowan et al. | |
| 2009/0188263 A1 | 7/2009 | Murray et al. | |

\* cited by examiner

*Primary Examiner* — Melvin Jones
(74) *Attorney, Agent, or Firm* — Baker & Hostetler LLP (57) ABSTRACT

A refrigerant recovery unit is provided that can clear oil from an oil inject path in order to prepare the unit to switch over to a different kind of oil. The refrigerant recovery unit includes an oil inject circuit that receives an oil from the oil bottle into the refrigerant system. The refrigerant recovery circuit is coupled in fluid communication with the oil inject circuit. The refrigerant recovery circuit is operable to receive and transfer a fluid drawn through the oil inject circuit. A controller is operatively connected to the refrigerant recovery circuit and to the oil inject circuit so that as the fluid is drawn through the oil inject circuit a quantity of the oil in the oil inject circuit is removed.

21 Claims, 5 Drawing Sheets

METHOD AND APPARATUS FOR CLEARING OIL INJECT CIRCUIT FOR CHANGING OIL TYPES

CROSS-REFERENCE TO RELATED APPLICATIONS

This application is a continuation of and claims priority to U.S. Patent Application entitled "Method and Apparatus for Clearing Oil Inject Circuit for Changing Oil Types," filed Oct. 20, 2008, having Ser. No. 12/254,202, now pending, which claims priority of U.S. Provisional 61/024,398, filed Jan. 29, 2008. The disclosure of each application is hereby incorporated by reference in its entirety.

FIELD OF THE INVENTION

The disclosure generally relates to automotive vehicle air conditioning systems, and more particularly to clearing oil from an oil inject circuit of a refrigerant recovery unit used to service a vehicle.

BACKGROUND OF THE INVENTION

Portable refrigerant recovery units or carts are used in connection with the service and maintenance of refrigeration systems including an automotive vehicle's air conditioning system. The refrigerant recovery unit connects to the air conditioning system of the automotive vehicle to recover refrigerant out of the system, separate out oil and contaminants, and recharge the system with additional refrigerant.

An oil inject portion of the refrigerant recovery unit is used to put the same amount of compressor oil back into the air conditioning system as was taken out during the recovery process. This may be a visual determination by reading a graduation on the oil drain bottle and on the oil inject bottle, or it may be an automated process.

The oil required in the air conditioning system of a conventional automotive vehicle typically differs from the oil required in a hybrid vehicle. Conventional automotive air conditioning systems typically use polyalkylene glycol lubricant ("PAG") oil as the refrigerant lubricant or compressor oil, whereas many hybrid vehicle systems use polyester ("POE") oil. These oils are generally not compatible with each other. Thus, there is a need to ensure that these various types of oil do not mix with each other between recovery processes.

SUMMARY OF THE INVENTION

In accordance with one embodiment of the present invention, a method of flushing oil from an oil inject circuit of a refrigerant recovery unit includes opening a vacuum solenoid, a high side inlet solenoid and an oil inject solenoid with a controller, removing a first type of refrigerant oil from the oil inject circuit by applying a vacuum from a vacuum pump to an oil inject hose line, the vacuum solenoid, the high side inlet solenoid and the oil inject solenoid, wherein the controller controls the vacuum pump, closing the vacuum solenoid, the high side inlet solenoid and the oil inject solenoid with the controller, and turning the vacuum pump off with the controller.

In accordance with another embodiment of the invention, a refrigerant recovery unit includes an oil injection circuit that is configured to receive a first refrigerant oil from a first refrigerant oil bottle and to inject the first refrigerant oil into a vehicle refrigerant system, wherein the oil injection circuit comprises an oil inject solenoid and an oil hose line, a high side inlet solenoid in communication with the oil inject solenoid, a vacuum pump configured to apply a vacuum, a vacuum solenoid in communication with the vacuum pump, and a controller configured to control the opening and closing of the oil inject solenoid, the vacuum solenoid, and the high side inlet solenoid, wherein the controller opens the oil inject solenoid, the vacuum solenoid, and the high side inlet solenoid and applies the vacuum to flush the first refrigerant oil from the oil injection circuit.

In accordance with yet another embodiment of the present invention, a refrigerant recovery unit is provided and includes means for injecting configured to receive a first refrigerant oil from a first refrigerant oil bottle and to inject the first refrigerant oil into a vehicle refrigerant system, wherein the means for injecting comprises an oil inject solenoid and an oil hose line, a high side inlet solenoid in communication with the oil inject solenoid, a vacuum pump configured to apply a vacuum, a vacuum solenoid in communication with the vacuum pump, and means for controlling configured to control the opening and closing of the oil inject solenoid, the vacuum solenoid, and the high side inlet solenoid, wherein the means for controlling opens the oil inject solenoid, the vacuum solenoid, and the high side inlet solenoid and applies the vacuum to flush the first refrigerant oil from the means for injecting.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
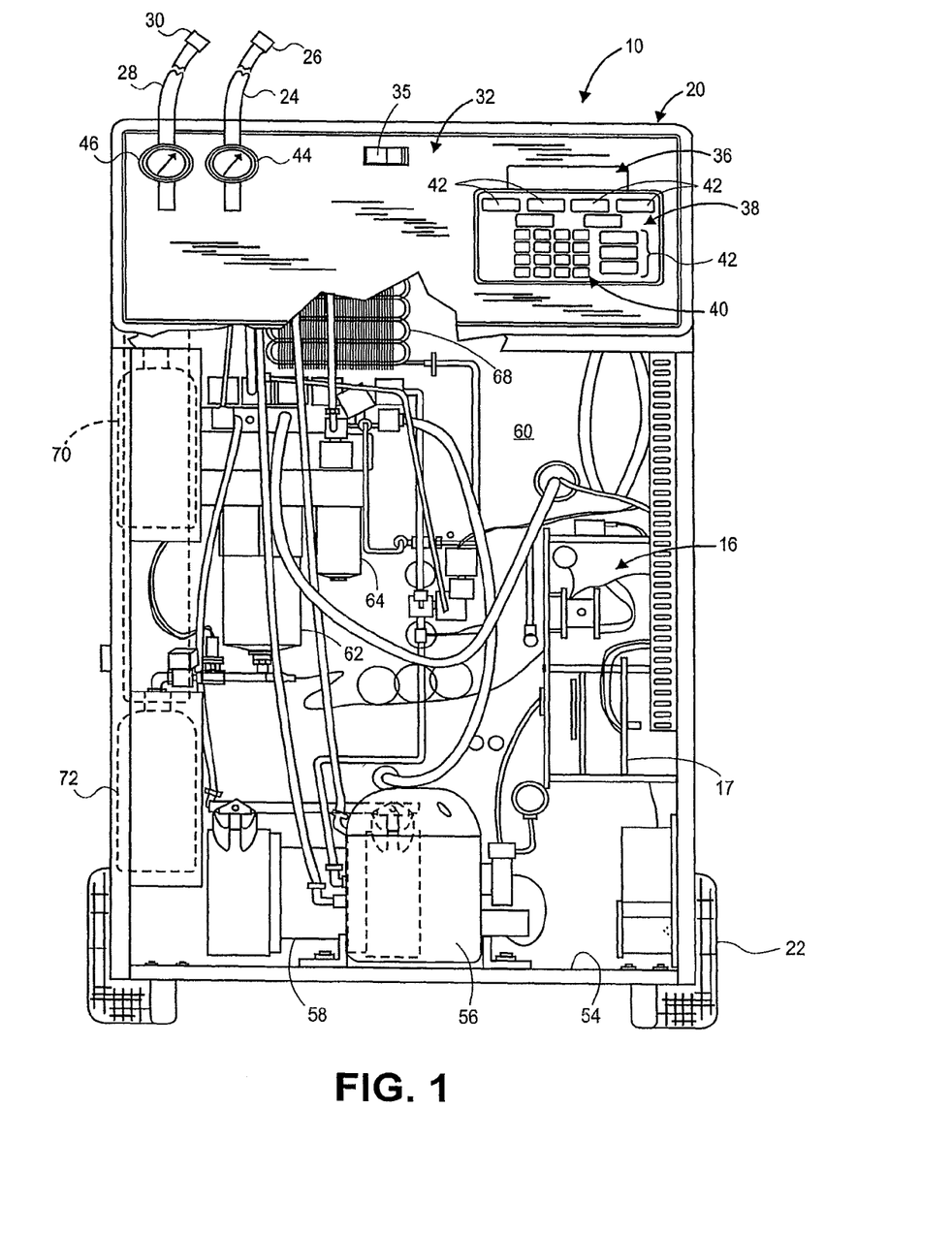
FIG. 1 is a fragmentary front plan view of an example refrigerant recovery unit shown with a portion of the front cover removed.
Figure 2:
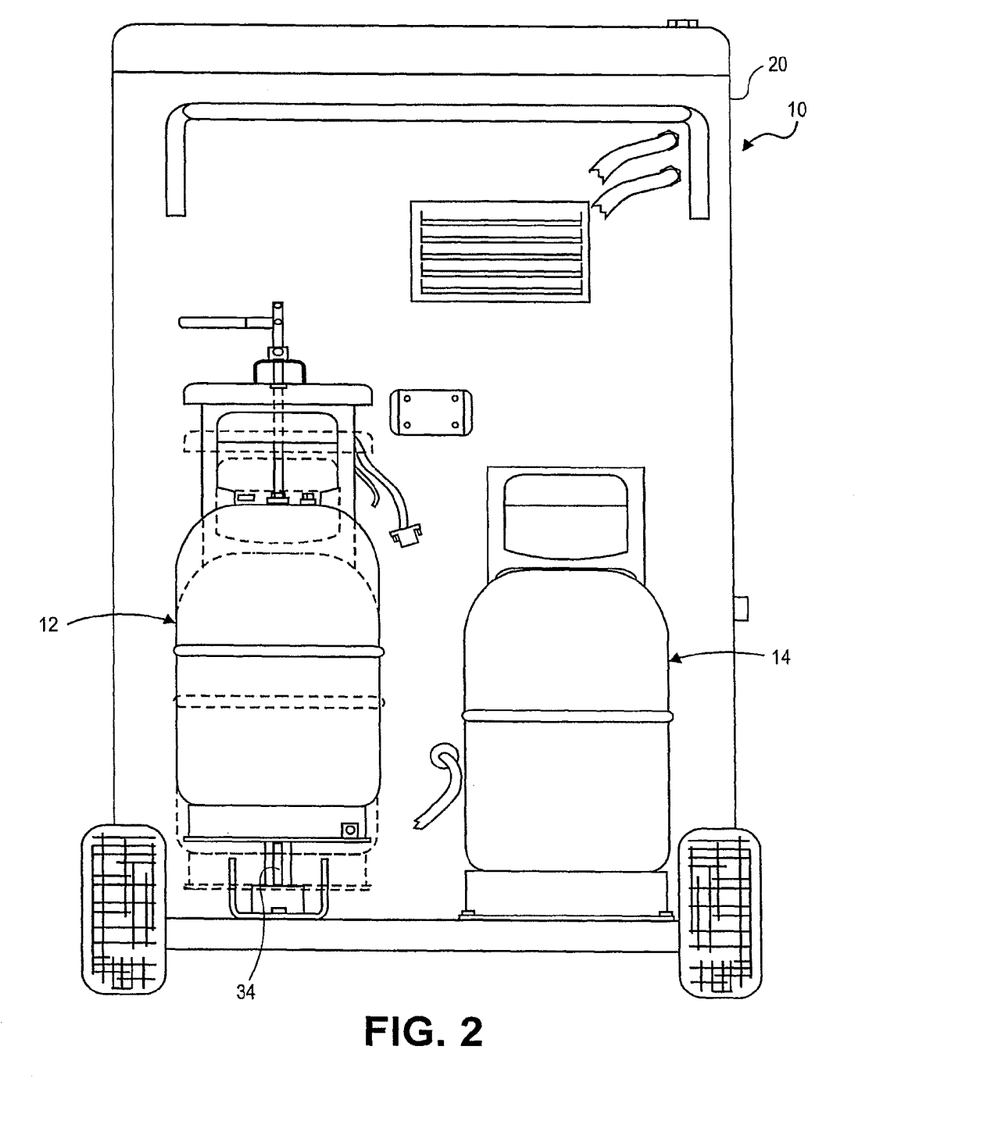
FIG. 2 is a fragmentary rear plan view of the refrigerant recovery unit shown in FIG. 1 according to an embodiment of the invention.

The invention will now be described with reference to the drawing figures, in which like numerals refer to like parts throughout. FIGS. 1 and 2 show an example of a portable refrigerant recovery unit 10 constructed according to principles of the invention, for recovering and recycling refrigerant from a refrigerant system, such as in an automotive vehicle. The recovery unit 10 includes a flushable oil inject circuit for removing traces of one kind of oil so that the unit 10 may service the another vehicle utilizing a different kind of oil. The refrigerant recovery unit 10 is a machine having a cabinet 20 supported by a pair of wheels 22, for portability. The unit 10 includes a first container or main tank 12 for holding a primary supply of refrigerant. The main tank 12 may also be referred to as an internal storage vessel (ISV). The primary supply of refrigerant or recovered refrigerant contains refrigerant that has been recovered from the air conditioning system. The unit 10 also includes a second container or auxiliary tank 14 for holding a secondary supply of refrigerant. The secondary supply of refrigerant has a known chemical composition, and is sometimes referred to as fresh refrigerant, virgin refrigerant or recharging refrigerant. The auxiliary tank 14 is arranged to be in fluid communication with the main tank 12 so that fresh refrigerant can be transferred from the auxiliary tank 14 to the main tank 12 as needed.

Figure 3:
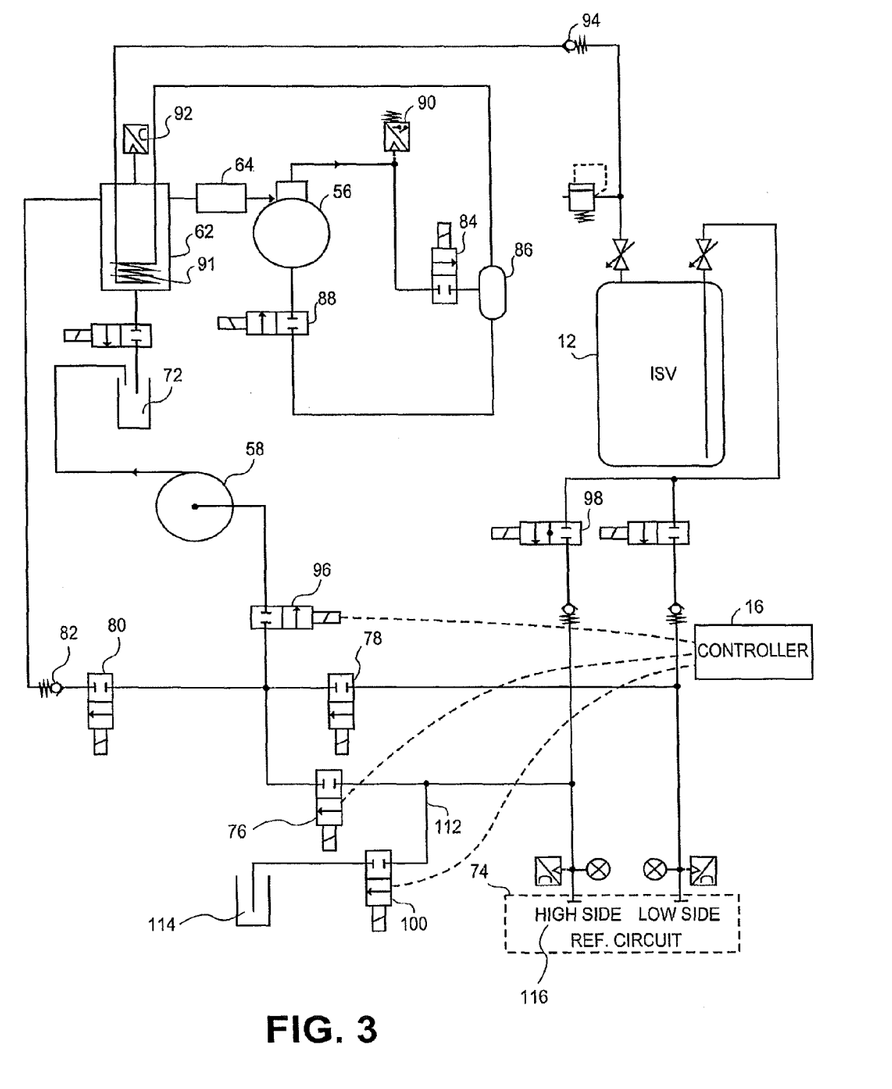
FIG. 3 is an example of a flow diagram of the refrigerant recovery unit shown in FIGS. 1 and 2.

An electronic controller 16 includes a microprocessor on a circuit board 17. The electronic controller 16 controls the transfer of refrigerant from the auxiliary tank 14 to the main tank 12 and between the main tank 12 and a refrigeration system 74 (FIG. 3). The controller 16 also controls electromechanical solenoid valves, including solenoid valves 76, 96, 100 (FIG. 3). Although only three solenoid valves are shown connected to the controller, each of the solenoid valves are connected to the controller. The controller 16 may include a memory unit to store software and data, and the microprocessor may be coupled to the memory unit for executing the software stored in the memory unit. The electronic controller 16 receives data signals from a variety of devices and sensors, including pressure sensors, temperature sensors, control switches (on the control panel 32), and a weighing device 34.

The weighing device 34 shown in the example embodiment is a load cell, but the weighing device may also be any type of electronic scale or any other type of weighing device configurable to transmit a weight data signal to the controller 16. As shown in FIG. 2, the main tank 12 rests on the weighing device 34. The weighing device 34 provides a weight data signal to the controller 16 such that the weight of the tank comprising its tare weight plus the weight of refrigerant therein is monitored by the controller 16.

The control panel 32 includes an on/off switch 35 and a display 36 for displaying the operational status of the refrigerant recovery unit's operation. The display may be an LCD display or other suitable electronic display that is coupled to the controller 16 by way of a conventional input/output circuit. The control panel 32 further includes a switch panel 38 having a conventional keyboard 40, and a plurality of push-button switches 42 for controlling the operation of the unit 10 through its various phases of operation and/or for selecting parameters for display. The keyboard 40 in conjunction with operational switches 42 and display 36 allow an operator to enter the desired operational parameters for the unit 10 according to manufacturer specifications for the servicing of an air conditioning system in a particular vehicle.

The refrigerant recovery unit 10 includes a high pressure hose 24, typically color coded red, with a coupling 26 for coupling to the high pressure port of an automotive vehicle refrigeration system and a low pressure hose 28, typically color coded blue, having a coupling 30 for coupling to the low pressure port. In some refrigerant systems, there may be only one port, for example, where the recovery or low pressure port is eliminated. In such systems, the refrigerant recovery unit may be configured with one hose, in accordance with the principles of the invention.

The front panel of the cabinet 20 is shown broken away in FIG. 1 to show the major elements of the refrigerant recovery unit 10. The input hoses 24 and 28 are coupled to pressure gauges 44 and 46, respectively, which are mounted on the front panel of refrigerant recovery unit 10, as seen in FIG. 1. In addition, electrical pressure transducers (not shown) may be coupled to the hoses 24 and 28, and to the controller 16 through conventional input/output circuits to provide the controller 16 with pressure information during operation of the unit 10. Gauges 44 and 46 provide the operator with a conventional analog or digital display of the pressure.

Mounted to the floor 54 of cabinet 20 is a fluid compressing means or compressor 56 and a vacuum pump 58. Behind the front of cabinet 20 on floor 54, is mounted the main tank 12 of refrigerant (FIG. 2) for the supply of refrigerant to the system being serviced. Also, mounted adjacent the main tank 12 is the auxiliary supply tank 14 which supplies additional refrigerant to the main tank 12. High pressure hoses and connectors together with control valves couple tank 14 to tank 12.

Mounted to the inside of rear wall 60 of cabinet 20 is an oil separator 62 and a compressor oil separator filter 64. In addition, a fresh oil canister 70 is mounted within a side compartment of cabinet 20. A recovery or waste oil container 72 is mounted on the lower part of the cabinet 20 to receive oil drained from the oil separator 62.

Figure 4:
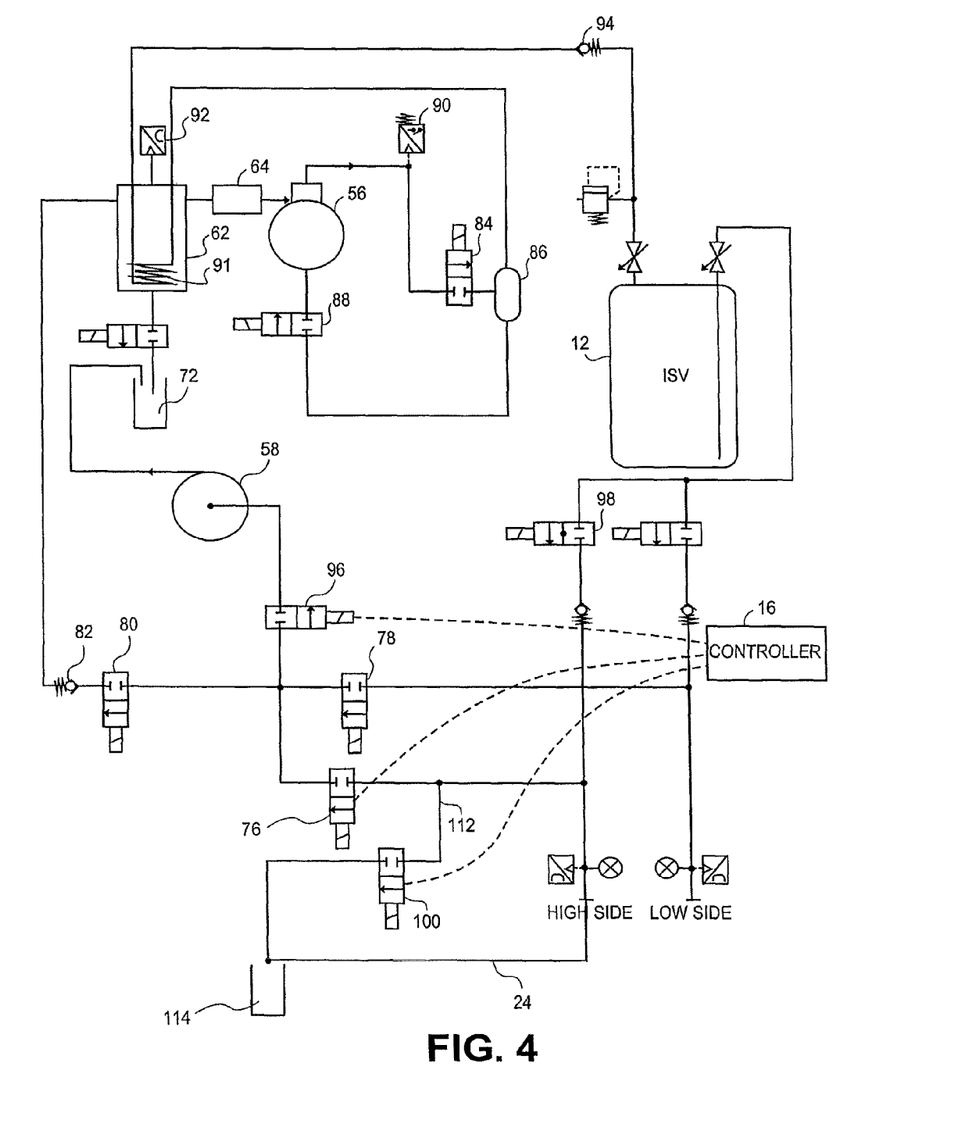
FIG. 4 is another example of a flow diagram of the refrigerant recovery unit shown in FIGS. 1 and 2.
Figure 5:
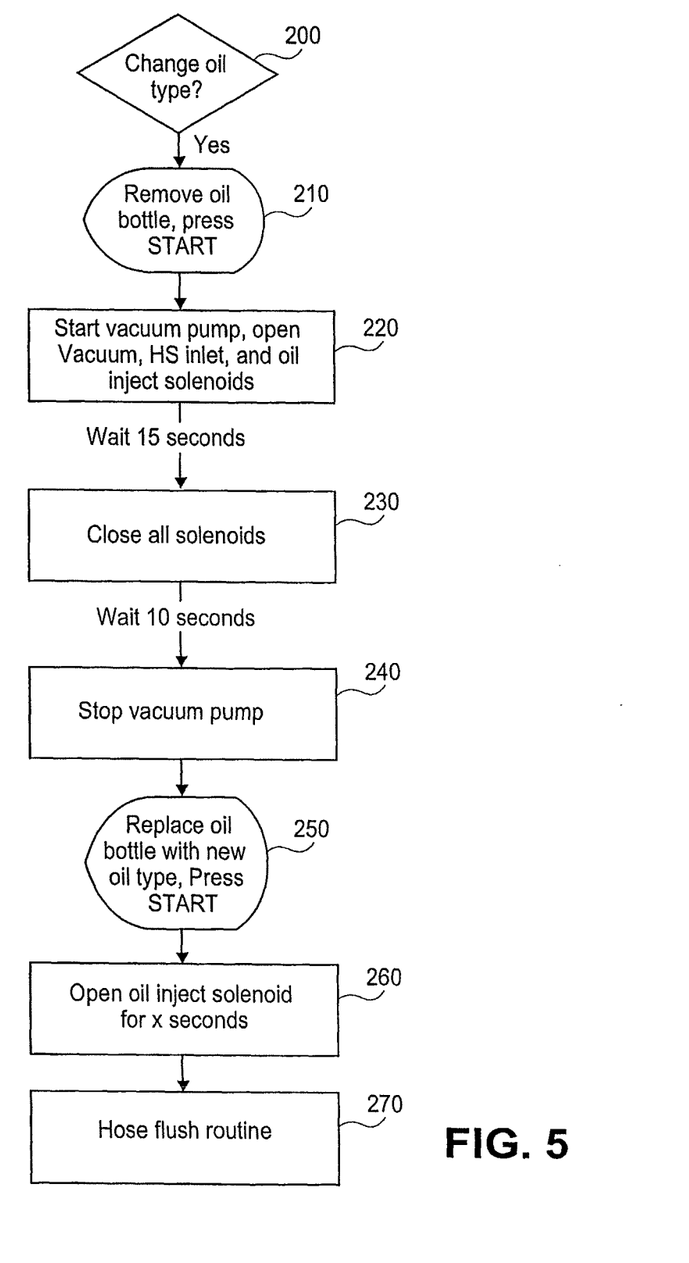
FIG. 5 is a flow chart illustrating operations that may be performed by the refrigerant recovery cart unit according to an embodiment of the invention.

Having briefly described the major components of the refrigerant recovery unit 10, a more detailed description of the structure and operation of the example refrigerant recovery unit 10 follows in connection with reference to FIGS. 3-5.

With respect to a recovery process, one example of a refrigerant recovery circuit is described below and shown in FIGS. 3-4. To recover refrigerant, initially, hoses 24 and 28 (FIG. 1) are coupled to the refrigeration system 74 of a vehicle, and the recovery cycle is initiated by the opening of high pressure and low pressure solenoids 76, 78, respectively. This allows the refrigerant within the refrigeration system 74 to flow through a recovery valve 80 and a check valve 82. The refrigerant flows from the check valve 82 into a system oil separator 62, where it travels through a filter/dryer 64, to an input of a compressor 56. Refrigerant is drawn through the compressor 56 through a normal discharge solenoid 84 and through the compressor oil separator 86, which circulates oil back to the compressor 56 through an oil return valve 88. The refrigerant recovery unit 10 includes a high pressure switch 90 in communication with the controller 16, which is programmed to determine an upper pressure limit, for example, 435 psi, to shut down the compressor 56 to protect the compressor 56 from excessive pressure, although this feature is optional. If a purging of the system is desired, a high-side clear solenoid (not shown) may optionally be coupled to the output of the compressor 56 to release the recovered refrigerant transferred from compressor 56 directly into the main tank 12, instead of through a path through the normal discharge solenoid 84.

The heated compressed refrigerant exits the oil separator 86 and then travels through a loop of conduit or heat exchanger 91 for cooling or condensing. As the heated refrigerant flows through the heat exchanger 91, it gives off heat to the cold refrigerant in the system oil separator 62, and assists in maintaining the temperature in the system oil separator 62 within a working range. Coupled to the system oil separator 62 is a switch or transducer 92, such as a low pressure switch or pressure transducer, for example, that senses pressure information, and provides an output signal to the microprocessor through a suitable interface circuit programmed to detect when the pressure has recovered the refrigerant down to 13 inches of mercury, for example. Finally, the recovered refrigerant flows through a normal discharge check valve 94 and into the main tank 12.

The evacuation cycle begins by the opening of high pressure and low pressure solenoids 76 and 78 and valve 96, leading to the input of a vacuum pump 58. Prior to opening valve 96, an air intake valve (not shown) is opened, allowing the vacuum pump 58 to start up exhausting air. The vehicle system 74 is then evacuated by the closing of the air intake valve and the opening of valve 96, allowing the vacuum pump 58 to exhaust any trace gases remaining until the pressure is approximately 29 inches of mercury, for example. When this occurs, as detected by pressure transducers optionally coupled to the high side and low side of the refrigeration system 74 and to the controller 16, the controller 16 actuates valve 96 by turning it off and beginning the recharging cycle.

The recharging cycle begins by opening charge valve 98 to allow the liquid refrigerant in tank 12, which is at a pressure of approximately 70 psi or above, to flow through the high side of the refrigeration system 74. The flow is through charge valve 98 for a period of time programmed to provide a full charge of refrigerant to the vehicle.

Having thus described the basic operations of the refrigerant recovery unit, the specific structure and operation of the refrigerant recovery unit 10 to clear oil or lubricant out of an oil inject path of the oil inject circuit will now be discussed with reference to FIGS. 3 and 4.

During the refrigerant recovery procedure, the refrigerant recovery unit 10 recovers refrigerant out of the refrigeration system 74, and separates out compressor oil and contaminants, and recharges the system with additional refrigerant. The compressor oil recovered out of the refrigeration system 74 lubricates the compressor and needs to be replaced back into the system 74.

In conventional automotive vehicle air conditioning systems, PAG oil is typically used as the refrigerant lubricant or compressor oil. Many hybrid systems with electric compressors use a different kind of oil, known as POE oil. The POE systems are sensitive to an electrical resistivity of the lubricant, because the lubricant contacts the electrical system. PAG oils typically have a lower resistivity than that of the POE oils, and this lower resistivity can create a potentially damaging leakage current. More particularly, for a given voltage, such as 300 volts which is approximately the operating voltage for a hybrid system, the lower resistivity translates into a high leakage current. Thus, if a certain percentage of the PAG oil gets into the hybrid system, the lower resistivity of the PAG oil and the resulting leakage current can cause electrical problems in the hybrid system.

In order to facilitate a service operator to service a variety of vehicles one after the other with the same refrigerant recovery unit 10, an apparatus and method are developed to clear oil of one type out of the refrigerant recovery unit 10 and to prepare the unit 10 to switch over to a new type of oil so that a different vehicle requiring the new type of oil may be serviced with the same unit.

Coupled in fluid communication with the refrigerant recovery circuit is an oil inject means for adding oil into the system 74. One example of an oil inject means is the an oil inject circuit. More particularly, the oil inject circuit may be arranged in fluid communication with the vacuum pump 58 of the recovery circuit.

Referring to the example embodiment shown in FIG. 3, the oil inject circuit includes an oil inject valve 100 and an oil inject hose or line 112. The oil inject hose 112 is one example of a fluid transportation means for transmitting oil to the refrigerant recovery circuit of the refrigerant recovery unit 10. The oil inject hose 112 may be one length of hose or multiple lengths of hose or tubing or any other suitable means for transporting fluid. The oil inject hose 112 connects on one end to an oil inject bottle 114 and on the other end couples to the refrigerant recovery circuit. The oil inject circuit couples to the recovery circuit by way of the oil inject hose between the high side solenoid 76 and the high side inlet 116. Disposed along the length of the oil inject hose is the oil inject valve 100. The oil inject valve 100 is preferably a solenoid actuated valve arranged in electrical communication with the controller 16 and configured to open and close when a corresponding signal from the controller 16 is received. The oil inject path follows from the oil inject bottle 114, though the oil inject solenoid 100, to the junction with the high side charge line, and to the refrigerant system 74.

To begin the process for removing the oil in the oil inject circuit, the oil inject bottle 114 is removed. With the oil inject bottle detached from the oil inject circuit, the end of the oil inject hose 112 that was connected to the oil inject bottle 114 is opened up to the air. Exposing the oil inject hose 112 to atmospheric pressure aides in permitting airflow through the hose, as will be discussed in more detail below. In addition, the oil inject solenoid 100, the high side inlet solenoid 76, and the vacuum solenoid 96 are opened. The solenoid valves are actuated by the controller 16 which operates to send communication to each of the valves to open them. With the oil inject bottle removed and the valves open, the vacuum pump 58 is turned on to generate airflow through the oil inject hose 112 and remove oil from the oil inject circuit. The pumping of the vacuum pump 58 generates enough velocity or airspeed to blow the compressor oil out of the oil inject circuit and deposit it into the waste oil drain bottle 72. The pumping continues for a length of time sufficient to flush out a desired percentage of the oil out of the oil inject circuit. The amount of time selected for running the vacuum pump may be a predetermined time such as 25 seconds that is built-in to the software program running on the refrigerant recovery cart 10 or it may any other length of time chosen to achieve the desired result. In an alternative embodiment, the vacuum pump 58 is operated for 15 seconds, then the oil inject solenoid 100 is closed to further evacuate the path between the vacuum pump 58 and the oil inject solenoid 100. The pump 58 continues, for example, 10 more seconds, then the high side inlet solenoid 76 and the vacuum solenoid 96 are closed. At this point, the vacuum pump 58 is stopped.

Once the oil is drained from the system, a new oil inject bottle 114 containing the appropriate type of oil for the next vehicle to be serviced may be installed on the refrigerant recovery unit 10. Since the oil inject hose 112 will be full of air from having operated the vacuum pump 58, a small amount of oil may be injected back into the circuit to purge the hose 112 of any air and small amounts of the old oil that may be left in the line.

If desired, the service hoses 24, 28 may optionally be flushed with refrigerant to remove oil remaining in the high side service hose 24. One such method for flushing the services hoses 24, 28 of the refrigerant recovery unit 10 is described in U.S. Ser. No. 12/248,352 incorporated herein in its entirety.

In an alternative example embodiment, a quantity of refrigerant is used to clean out the oil inject circuit. As shown in FIG. 4, the oil inject circuit may modified so that a service hose, such as the high side service hose 24, may be coupled in fluid communication with the oil inject line 112 so that refrigerant may be used to flush out any oil remaining in the oil inject circuit. The high side service hose is coupled to the end of the oil inject tube that connects to the oil inject bottle so that refrigerant may be flushed through the oil inject path from beginning to end.

With the oil bottle removed, the process for clearing oil from the oil inject circuit using refrigerant begins by opening the high side charge solenoid 98, the oil inject solenoid 100, and the recover solenoid 80. With the high side charge solenoid 98 opened, refrigerant may be transferred from the primary supply tank 12 through the high side charge solenoid 98 to the high side inlet of the refrigerant recovery unit 10, through the high side service hose 24 and into the oil inject circuit. As the refrigerant is received into the oil inject circuit, it pushes the oil through the oil inject circuit and through the refrigerant recovery circuit. When in the refrigerant recovery circuit, the refrigerant and oil cycles through the normal refrigerant recovery circuit for recovering refrigerant into the primary supply tank 12 including separating out oil into the waste oil container 72, as described above. When the operation is completed, the high side service hose 24 is disconnected from the oil inject circuit. If desired, this method may also be followed by a flushing of the refrigerant recovery unit service hoses, as previously discussed.

Example operations that may be performed by the refrigerant recovery unit 10 to flush the oil from the oil inject circuit in connection with the embodiment illustrated in FIG. 3, will next be described. As shown in FIG. 5, the software program begins at operation 200 with a prompt to a user asking if it is desired to change the oil type. If YES is selected, the program then prompts the user to remove the oil inject bottle and to press the START button, as indicated by operation 210. To initiate flushing the oil out of the oil inject lines, the controller 16 turns on the vacuum pump 58, and opens the vacuum solenoid 96, the high side inlet solenoid 76 and the oil inject solenoid 100, as indicated by operation 220. The vacuum pump is operated for a period of time, for example, 15 seconds. It is to be understood that the process is not limited to a period of 15 seconds but that any time between 2 seconds to 30 seconds is also contemplated. Any period of time sufficient clear the lines of residual oil may be used.

Once the lines are clear, the controller 16 acts to close each of the solenoids. Initially, only the oil inject solenoid 100 is closed so that the path between the vacuum pump 58 and the oil inject line may be further evacuated. With the oil inject solenoid 100 closed, the vacuum pump 58 continues to pump for some additional period of time, for example, 10 additional seconds, or until substantially all of the air is pumped out of the lines. Then, the vacuum solenoid 96 and the high side inlet solenoid 76 are closed, as indicated in operation 230. After, each of the solenoids are closed, the controller 16 stops the vacuum pump, as indicated at operation 240.

Next, the user is prompted to install the new oil inject bottle containing the new oil type, and to press START, as indicated at operation 250. With the new oil inject bottle in place, the controller 16 operates to open the oil inject solenoid 100, as indicated at operation 260. The oil inject solenoid 100 is opened for a period of time sufficient to fill the high side line with the new oil type, for example, a period of 5 seconds. With the described method, the oil inject circuit is cleared of the old oil, and the oil inject lines are filled with the new oil. However, there is still amount of the old oil remaining in the high side service hose. To clear the high side service hose, the controller 16 operates to flush refrigerant through the oil inject circuit, using the hose flush routine disclosed and described in U.S. Ser. No. 12/248,352 discussed above, as indicated at operation 270. The steps discussed herein can be automated through the use of a software program.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of flushing oil from an oil inject circuit of a refrigerant recovery unit, comprising the steps of:
   opening a vacuum solenoid, a high side inlet solenoid, and an oil inject solenoid with a controller;
   removing a first type of refrigerant oil from the oil inject circuit by applying a vacuum from a vacuum pump to an oil inject hose line, the vacuum solenoid, the high side inlet solenoid, and the oil inject solenoid, wherein the controller controls the vacuum pump;
   closing the vacuum solenoid, the high side inlet solenoid, and the oil inject solenoid with the controller; and
   turning the vacuum pump off with the controller.

2. The method of claim 1 further comprising the steps of:
   opening the oil inject solenoid for a predetermined period of time to inject a portion of a second type of refrigerant oil into the oil injection circuit; and
   performing a hose flush routine to remove any remaining first type of refrigerant oil from the oil injection circuit.

3. The method of claim 1 further comprising the steps:
   injecting a refrigerant into the oil injection circuit when the oil inject hose line is coupled to a high side service hose to complete a charging circuit; and
   flushing the oil injection circuit with the refrigerant.

4. The method of claim 1, wherein the oil inject solenoid is closed before the vacuum solenoid and the high side inlet solenoid are closed.

5. The method of claim 4 further comprising the step of continuing to apply the vacuum after the oil inject solenoid is closed, but while the vacuum solenoid and the high side inlet solenoid are still open.

6. The method of claim 1 further comprising the step of requesting from a user whether to perform an oil type change in the refrigerant recovery unit on a display of the refrigerant recovery unit.

7. The method of claim 1, wherein the vacuum is applied for about 2 seconds to about 30 seconds.

8. The method of claim 1 further comprising the step of injecting a second type of refrigerant oil into the oil inject hose line to purge the oil inject hose line of the first type of refrigerant oil.

9. A refrigerant recovery unit, comprising:
   an oil injection circuit that is configured to receive a first refrigerant oil from a first refrigerant oil bottle and to inject the first refrigerant oil into a vehicle refrigerant system, wherein the oil injection circuit comprises an oil inject solenoid and an oil hose line;

a high side inlet solenoid in communication with the oil inject solenoid;

a vacuum pump configured to apply a vacuum;

a vacuum solenoid in communication with the vacuum pump; and a controller configured to control the opening and closing of the oil inject solenoid, the vacuum solenoid, and the high side inlet solenoid, wherein the controller opens the oil inject solenoid, the vacuum solenoid, and the high side inlet solenoid and applies the vacuum to flush the first refrigerant oil from the oil injection circuit.

10. The refrigerant recovery unit of claim 9, wherein after the controller opens the oil inject solenoid, the vacuum solenoid, and the high side inlet solenoid, then the oil inject solenoid is closed before the vacuum solenoid and the high side inlet solenoid are closed.

11. The refrigerant recovery unit of claim 9, wherein the vacuum is applied for about 2 seconds to about 30 seconds.

12. The refrigerant recovery unit of claim 9, wherein the oil injection circuit is further configured to inject a second refrigerant oil from a second refrigerant oil bottle and to inject the second refrigerant oil into the vehicle refrigerant system.

13. The refrigerant recovery unit of claim 9, wherein the first refrigerant oil bottle is coupled to the oil hose line but is uncoupled from the oil hose line before the vacuum is used to flush the oil injection circuit.

14. The refrigerant recovery unit of claim 9, wherein when a second refrigerant oil bottle is coupled to the oil injection circuit, the oil injection solenoid is opened for a predetermined period of time to flush out the first refrigerant oil.

15. The refrigerant recovery unit of claim 10, wherein the vacuum pump continues to apply the vacuum after the oil inject solenoid is closed but while the vacuum solenoid and the high side inlet solenoid are still open.

16. A refrigerant recovery unit, comprising:

means for injecting configured to receive a first refrigerant oil from a first refrigerant oil bottle and to inject the first refrigerant oil into a vehicle refrigerant system, wherein the means for injecting comprises an oil inject solenoid and an oil hose line;

a high side inlet solenoid in communication with the oil inject solenoid;

a vacuum pump configured to apply a vacuum;

a vacuum solenoid in communication with the vacuum pump; and means for controlling configured to control the opening and closing of the oil inject solenoid, the vacuum solenoid, and the high side inlet solenoid, wherein the means for controlling opens the oil inject solenoid, the vacuum solenoid, and the high side inlet solenoid and applies the vacuum to flush the first refrigerant oil from the means for injecting.

17. The refrigerant recovery unit of claim 16, wherein after the means for controlling opens the oil inject solenoid, the vacuum solenoid, and the high side inlet solenoid, then the oil inject solenoid is closed before the vacuum solenoid, and the high side solenoid are closed.

18. The refrigerant recovery unit of claim 16, wherein the vacuum is applied for about 2 seconds to about 30 seconds.

19. The refrigerant recovery unit of claim 16, wherein the means for injecting is further configured to inject a second refrigerant oil from a second refrigerant oil bottle and to inject the second refrigerant oil into the vehicle refrigerant system.

20. The refrigerant recovery unit of claim 19, wherein when second refrigerant oil bottle is coupled to the means for injecting, the oil injection solenoid is opened for a predetermined period of time to flush out the first refrigerant oil.

21. The refrigerant recovery unit of claim 17, wherein the vacuum pump continues to apply the vacuum after the oil inject solenoid is closed but while the vacuum solenoid and the high side solenoid are still open.

* * * * *